United States Patent
Casellas et al.

(10) Patent No.: US 6,591,948 B2
(45) Date of Patent: *Jul. 15, 2003

(54) PISTON WITH SUPPORT WEBS FOR A PISTON-CYLINDER ARRANGEMENT, IN PARTICULAR A SHOCK ABSORBER PISTON

(75) Inventors: Antonio Casellas, Siegburg (DE); Ewald May, Bonn (DE)

(73) Assignee: GKN Sinter Metals GmbH, Radevormwald (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/834,353

(22) Filed: Apr. 13, 2001

(65) Prior Publication Data

US 2002/0117366 A1 Aug. 29, 2002

Related U.S. Application Data

(63) Continuation of application No. PCT/EP99/07641, filed on Oct. 12, 1999.

(30) Foreign Application Priority Data

Oct. 14, 1998 (DE) .......................................... 198 47 342

(51) Int. Cl.⁷ .................................................. F16F 9/36
(52) U.S. Cl. .................................. 188/322.18; 267/129
(58) Field of Search ....................... 188/322.15, 322.18, 188/316, 282.5; 267/124, 129

(56) References Cited

U.S. PATENT DOCUMENTS

| 2,912,069 | A | * | 11/1959 | Dillenburger | ............. | 137/493.8 |
|---|---|---|---|---|---|---|
| 3,212,411 | A | * | 10/1965 | Storms | ........................ | 285/909 |
| 3,730,305 | A | * | 5/1973 | Fouts | ..................... | 188/322.15 |
| 4,591,033 | A | * | 5/1986 | Taylor | ......................... | 188/317 |
| 4,610,332 | A | * | 9/1986 | Mourray | ....................... | 137/517 |
| 5,785,160 | A | | 7/1998 | Grundei | ....................... | 188/322 |
| 2002/0046651 | A1 | * | 4/2002 | Castellas et al. | ............... | 92/248 |
| 2002/0056368 | A1 | * | 5/2002 | May | ............................ | 92/248 |

FOREIGN PATENT DOCUMENTS

| DE | 0682190 A2 | * | 5/1995 |
| DE | 44 21 968 A1 | | 1/1996 |
| DE | 296 23 140 U1 | | 11/1996 |
| EP | 0 345 561 | | 5/1989 |
| EP | 0 407 865 A2 | | 7/1990 |
| EP | 0 658 611 A1 | | 11/1994 |

* cited by examiner

Primary Examiner—Christopher P. Schwartz
Assistant Examiner—Xuan Lan Nguyen
(74) Attorney, Agent, or Firm—Woodcock Washburn LLP

(57) ABSTRACT

The invention relates to a piston-cylinder arrangement, especially a shock absorber piston, comprising a piston body fitted with a peripheral web protruding from the peripheral surface in a section adjacent to the end of the piston to which support webs are attached, said web extending parallel and spaced in relation to each other in longitudinal direction towards the other end of the piston. Two adjacent support webs limit a groove-shaped recess, said webs being open on the ends opposite the peripheral web in longitudinal direction. The piston also comprises a collar-shaped sealing element made of thermoformable plastic material that is formed on the piston body in such a way that only part of the height of both the peripheral web and the support webs is formed in the material of the collar-shaped sealing element.

13 Claims, 2 Drawing Sheets

Figure 1:
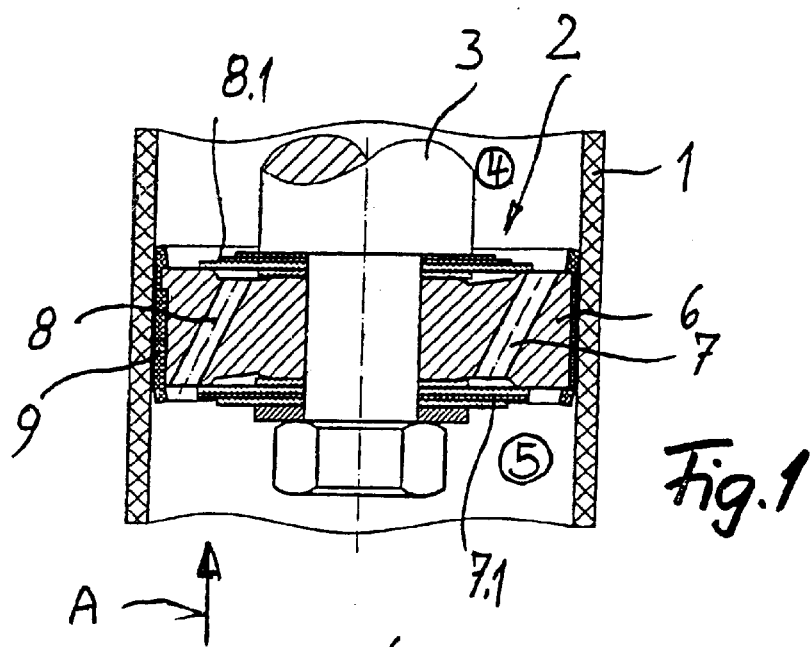

PISTON WITH SUPPORT WEBS FOR A PISTON-CYLINDER ARRANGEMENT, IN PARTICULAR A SHOCK ABSORBER PISTON

This is a continuation of application No. PCT/EP99/07641, filed Oct. 12, 1999, now abandon.

There is a shock absorber piston known from EP-A-0 658 611 that has a piston body that is provided with a peripheral web at its peripheral surface. A number of webs running in the axial direction attach to this peripheral web on one side of it. A seal made of thermoplastic synthetic is sprayed onto this piston body in an injection molding process. The webs extending in the axial direction and the notches between them, which are filled in with sealing material, serve to reliably anchor the sealing material and to guide the piston. The seal applied by injection molding enables close tolerancing, which prevents "blow-by" and thus provides a reliable seal of the cylindrical spaces facing one another. The process to produce these types of injection-molded seals is relatively expensive.

There is a piston-cylinder arrangement known from U.S. Pat. No. 3,212,411 whose piston body has a number of peripheral grooves on its peripheral surface. To apply the seal, a cup-shaped preliminary mold made of PTFE (polytetrafluoroethylene) is provided that is first placed on the piston body loosely. The piston body so prepared is then pressed into a forming and calibrating cylinder that is heated to a high temperature. Under the influence of the heat, the PTFE material is pressed into the grooves on the peripheral surface of the piston body. Then, the piston body with the pressed-on seal is cooled in an appropriately designed cooling cylinder. The grooves are completely filled with the sealant material so as to provide a form-locked solid connection of the seal to the peripheral surface of the piston body. When used as a shock absorber piston, the bottom surface of the preliminary mold that still overlaps the end surface of the piston body on one side must then be removed.

There is a shock absorber piston known from EP-A-682 190 whose only essential difference from the processes described above in its manufacture is in that to apply the seal, instead of a cup-shaped preliminary mold, a stamped circular sleeve is used. This circular sleeve is placed on one end of the piston body. The piston body prepared thusly is then pressed into a heated forming and calibrating cylinder, wherein the circular sleeve is placed around the peripheral surface of the piston body as a strip and then pressed into the grooves running in the peripheral direction of the piston body under the influence of heat. Then, the piston with its pressed-on seal is guided through a cooling tube. Here, as well, the sealant material fills the grooves practically completely so that the seal is solidly connected to the peripheral surface of the piston body in form-locked fashion.

The two processes described above have the disadvantage in that considerable pressures are required to shape and to press the sealant material into the grooves on the peripheral surface of the piston body. Also, the sealant material forming the seal is subject to strong shaping forces that disadvantageously-influence the structure of the sealant material.

The objective of this invention is to produce a piston, in particular a shock absorber piston, in which the disadvantages described above are avoided.

This objective is met according to the invention by a piston for a piston-cylinder arrangement, in particular a shock absorber piston, with a piston body that is provided with at least one peripherally running web on its peripheral surface in an area adjacent to one end of the piston, said web protruding above the peripheral surface. Support webs extending to the other end of the piston running parallel in the longitudinal direction and separated from one another attach to this peripheral web. Between any two neighboring support webs, which are open in the longitudinal direction at their ends opposite the peripheral web, is a notch-shaped recess. The piston according to the invention also has a collar-shaped seal made of a thermoplastic sealing material that is formed onto the piston body in such away that both the peripheral web as well as the support webs press into the material of the seal at least over a portion of their height. Surprisingly, it has been shown that, in order to get a good seal between the collar-shaped seal of the piston on the one hand and the interior wall of the cylinder on the other, it is not required that the seal lie against the full height of the piston body. It is enough for the sealing collar to be supported in the peripheral direction along the relatively narrow peripheral web. Furthermore, it has been shown surprisingly that, for an acceptable and reliable connection between the seal and the piston body, it is not required that the notch-shaped recesses between the longitudinal support webs are completely filled by the sealing material as is known from EP-A-0 685 611. It has been shown for shock absorber pistons on which the collar-shaped seal is formed in the manner described in EP-A-682 190 that it is enough if, in addition to the peripheral web, the longitudinal support webs press into the material of the seal over only a portion of their height as well. On one hand, this results in an acceptable form-lock between the collar-shaped seal and the piston body, and indeed both in the longitudinal direction as well as in the peripheral direction. On the other hand, only moderate shaping forces on the sealing material result. The result is that not only do minimal pressure forces have to be applied, but material flow is also kept to a very minimum during the deformation, thus preventing a disadvantageous influence on the material structure for practical purposes. Even if the circular sleeve is deformed to such an extent that the notch-shaped recesses are completely filled in, the sealing material deforms in the perpendicular direction due to the motion of the piston body in the direction of the recess. This effects a favorable "material flow" so that even in case of this deformation, a disadvantageous influence of the material structure is prevented. Since the notch-shaped recesses between the support webs are not completely filled in due to their being only partial pressed, enough free space remains into which the sealing material can give way when expansions occur due to temperature increases, while the piston is guided by the longitudinal support webs with no problem. It is a good idea here if the longitudinal webs extend up to the end of the piston body.

In another advantageous embodiment of the invention, it is provided that each of the edges of the collar-shaped seal extends beyond the end surface of the piston body associated with it. Since the collar-shaped seal is produced according to a known process from a circular sleeve, the phenomenon of "back memory" of the sealant material described in EP-A-0 682 190 can be used to cause the edge around the inner diameter of the circular sleeve to pull inward after it is applied to the piston body, and to cause the edge of the collar-shaped seal produced from the external edge of the circular sleeve to move back outward and in this way to protrude above the rest of the peripheral surface of the collar-shaped seal as a lip seal. If the piston body is installed such that, when used as a shock absorber piston, the piston surface provided with the lip-shaped edge extending outward faces the pressurized side, i.e. the side subjected to the high load, and if the piston surface with the edge that springs back inward is located on the so-called suction side, this results in an improved seal of the piston in the shock absorber cylinder during a pressure load since the hydraulic fluid in the lip-shaped edge presses against the cylinder wall. When it springs back, i.e. for suction loads, the hydraulic fluid can then enter the intermediate space between the piston wall and the cylinder wall to some degree as a result of the minimal play between the two. The fluid can thus find its way up to the edge where the lip-shaped edge of the collar-shaped seal sits against the cylinder wall for the purposes of lubrication. Thus, acceptable lubrication is provided, preventing wear of the seal. Since the flow resistance due to this minimum gap between the sealing surface of the piston and the cylinder wall is considerably higher than the flow resistance through the flow channels in the piston body, practically no drop in performance results.

In an especially useful embodiment of the invention, it is provided that the longitudinal webs on the piston body run at an angle on the peripheral surface with respect to the piston axis. As a result of the slanted arrangement of the support webs, the advantage arises in that the entire surface of the piston sits on its seal as seen from the peripheral direction since each notch sitting between two longitudinal webs is overlapped when the longitudinal webs are slanted accordingly with respect to the piston axis. This provides an even contact pattern on the surface of the seal over the height of the piston, even if the sealant material should drop into the incompletely filled notch-shaped recesseso some degree. Since the mechanical load on the form-locked connection between the seal and the piston body occurs only in the direction of motion for practical purposes, the slanted arrangement of the support webs offers an additional component of support in the direction of motion.

Other embodiments of the invention are given in the subordinate claims.

Figure 2:
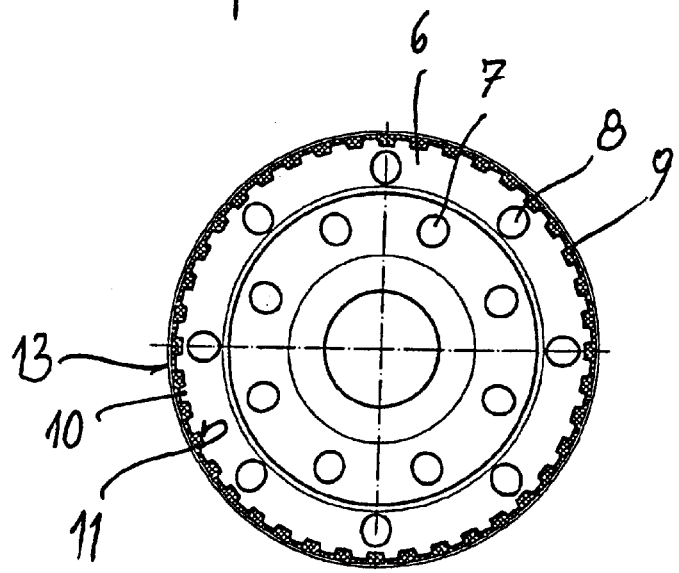
Figure 3:
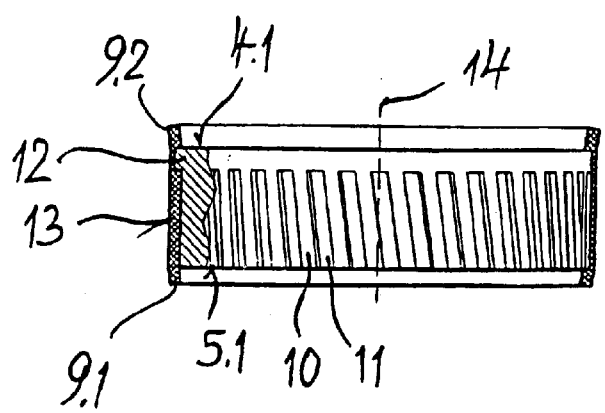
Figure 4:
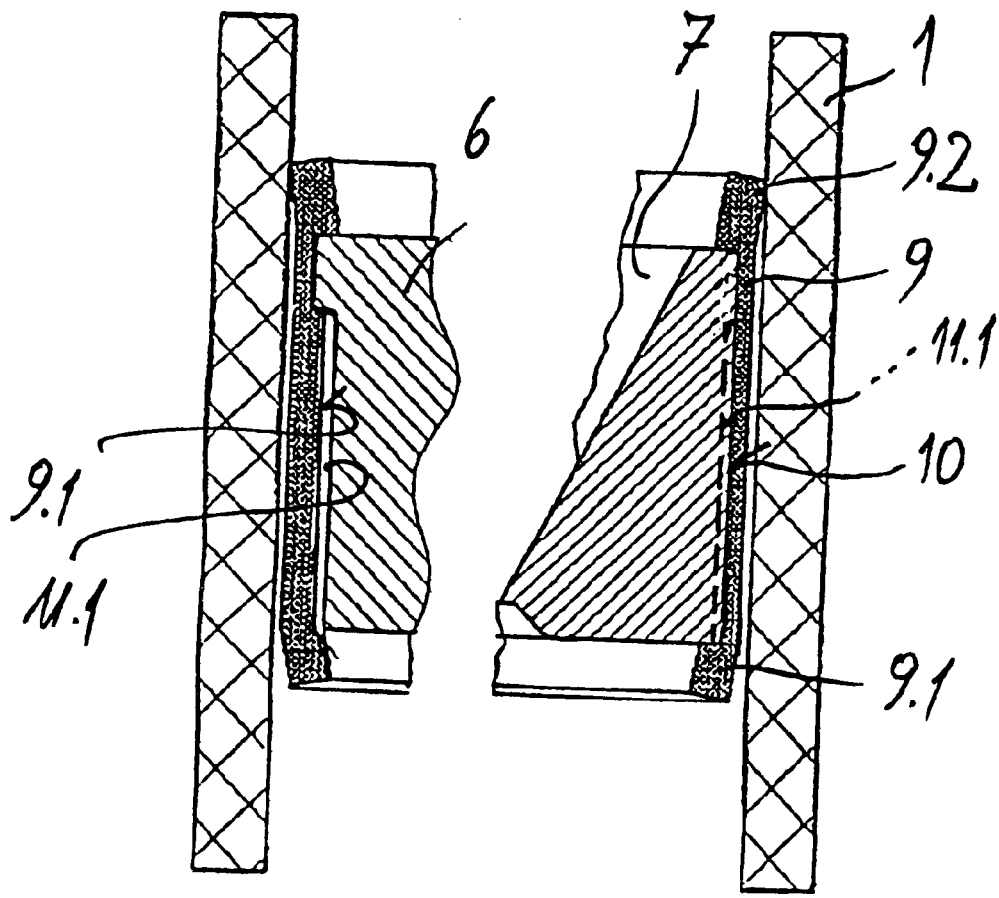

The invention is explained in more detail with the help of schematic drawings of an embodiment example. Shown are:

FIG. 1 a partial section in the axial direction through a piston-cylinder arrangement for a shock absorber, FIG. 2 a top view of the piston in the direction of arrow A, FIG. 3 a side view of the piston in partial section FIG. 4 an enlarged partial section through the piston of the arrangement according to FIG. 1.

FIG. 1 shows an axial section through a shock absorber that connects two movable parts relative to one another, for example a vehicle axis and a vehicle frame. The shock absorber has a cylindrical part I that is connected to one of the two parts that are movable with respect to one another. A piston 2 is guided inside cylinder 1 that is fastened to a piston rod 3 whose free end is fixed to the other part of the parts moving relative to one another. The cylinder 1 is closed on both sides and is filled with a hydraulic fluid so that the piston-cylinder arrangement is designed to be dual-acting, with the piston separating two cylinder spaces 4, 5 from one another.

The piston body 6 of the piston 2 has a number of penetration channels 7, 8 running alongside one another. A throttle valve 7.1 and 8.1 covers the exit side of each of the penetration channels 7, 8. The function of these exits is yet to be explained. This arrangement is designed such that a number of penetration channels 7 and a number of penetration channels 8 are arranged in alternating fashion around the cylinder axis.

The peripheral surface of the piston 2 is provided with a collar-shaped seal 9 that seals off cylinder space 4 against cylinder space 5. When the piston 2 moves toward cylinder space 4, the fluid is pushed through the penetration channels 7 against the return force of the throttle valve 7.1. The penetration openings 8 are held shut by the pressure of the fluid space 4 acting on the throttle valve 8.1. When it moves in the reverse direction, the penetration channels 7 are closed by throttle valve 7. 1, with the fluid now able to flow back through the flowing channels 8 out of cylinder space 5 into cylinder space 4.

FIG. 2 shows a top view of the piston 2 as seen in the direction of arrow A in FIG. 1 without the arrangement of the throttle valves 7.1 and 8.1. The piston body 6 is provided with a multitude of longitudinal support webs 10 on its peripheral surface, each of which lies adjacent to corresponding notch-shaped recesses. In the embodiment example shown here, the notch-shaped recesses 11 are arranged such that they extend from one of the end surfaces, for example end surface 5.1, of the piston body 6, up to a peripheral web 12 (FIG. 3) that runs in the peripheral direction at the other end of the piston body 6 in an area near to or adjacent to end surface 4.1 and that borders the notch-shaped recesses 11 at this end of the piston. The peripheral web 12 and the longitudinal support webs 10 have the same height on the exterior surface of the piston body 6.

The collar-shaped seal 9 arranged on the peripheral surface of the piston body 6 consists of a thermoplastic synthetic material, preferably PTFE. In the embodiment example shown here, the collar-shaped seal 9 was formed onto the peripheral surface of the piston body 6 by heat forming a circular sleeve, with the edge 9.1 of the seal 9 being formed by the inner edge of the circular sleeve and the edge 9.2 being formed by the outer edge of the circular sleeve. The width of the circular sleeve was dimensioned such that it was wider than the thickness of the piston body 6 in the axial direction. By doing so the edge 9.1 produced by the inner edge of the circular sleeve is pulled inward after deformation whereas the edge 9.2 produced by the outer edge of the circular sleeve is bent outward, thus forming a functioning lip seal.

In heat forming of the circular sleeve, the webs 10 and 12 press into the material of the collar-shaped seal 9 over only a portion of their height so that a certain amount of free space remains between the material of the seal 9 and the bottom of the notch-shaped recesses 11. This allows the sealing material to freely flow into the notch 11 without being squeezed when the seal 9 is formed. In this shaping process, the cylindrical exterior surface 13 of the seal 9 is simultaneously calibrated so that the desired tolerances to the inner diameter of the cylinder 1 can be maintained. Since the overall system heats up during operation when these piston-cylinder arrangements are used as shock absorbers, this remaining free space in the base of the notch also allows the sealing material to expand into the notch within certain limits so that the wear of the seal on the peripheral surface of the seal 9 adjacent to the edges is reduced.

The piston 2 is shown in FIG. 3 in a side view with the seal 9 removed. The side view shows that the notch-shaped recesses 11 run at an angle in relation to the piston axis 14. The angle is dimensioned such that, for example, the end of a longitudinal support web 10 facing end surface 4. 1, as seen in the longitudinal direction, overlaps the open end, located at the end 5.1 of the piston body 6, of the notch-shaped recess 11 adjacent to it. In this way, the collar-shaped seal 9 covering the surface of the peripheral web 12 and the longitudinal support webs 10 effects a complete surface coverage of the inner wall of the cylinder when the piston is moved in the longitudinal direction in cylinder 1. In the continuously alternating back and forth motion of a shock absorber piston, for example, this prevents longitudinal grooves from working into the inner wall of the cylinder. At the same time, making the support webs 10 angled offers an additional support to the seal 9 off of the piston body 6 acting in the direction of motion. Yet the piston 2 is supported along its entire length practically tilt-free.

The enlarged diagram of a piston 2 according to FIG. 4 in a partial longitudinal section shows that the collar-shaped seal 9 is formed on to the piston body 6 such that both the peripheral web 12 as well as the longitudinal support webs 10 press into the sealing material only over a portion of their height so that a minimal amount of free space remains in each of the notch-shaped recesses 11 between the inner surface 9.1 of the collar shaped seal 9 and the base 11.1 of the notch-shaped recess 11 (left side of FIG. 4). However, the longitudinal support webs 10 are covered throughout by the collar-shaped seal 9 at the same thickness as a peripheral web 12. Depending on the wall thickness of the collar-shaped seal 9 in the area of the support webs 10 and depending on the flexibility of the sealant material, the pressure in cylinder space 5 that builds up when the piston 2 moves in the direction of the arrow 15 can also act on the free space between the inner surface 9.1 and the base of the notch 11.1, and can widen this part of the seal to a small degree and improve the seal between the piston and the cylinder wall.

This type of piston body 6 can be formed from one or even two element sections manufactured through powder metallurgy. It is pressed in its entirety or in the form of element sections from a sintering metallurgical powder. Pressed element sections are then put together in an assembly operation accordingly. The one or two-part pressed part is then sintered. An unmachined shape with this kind of geometry is more cost effective than a machined manufacture.

It is also possible to provide support webs 10 running in the direction of the longitudinal axis 14, i.e. running straight. The length of the support webs 10 can also be selected to be shorter so that a smooth, deep ring surface remains up to end surface 5.1. In a powder-metallurgical manufacturing process, it is however useful if the support webs 10 extend from the peripheral web 12 up to the other end of the piston body 6 since, then, a piston body with a more even material thickness results from pressing and sintering. Likewise, it is also possible to provide another shape of the penetration channels 7, 8 at the piston body. In a piston body put together from two element sections, it is also possible to provide a peripheral web 12 on both ends.

What is claimed is:

1. A piston for a piston-cylinder arrangement comprising a piston body including at least one peripheral web on its peripheral surface in an area adjacent to a piston end, said peripheral web protruding above the peripheral surface and to which substantially longitudinal support webs attach, said support webs run parallel longitudinally at a distance from one another and extend in the direction toward the other end of the piston, wherein there is a notch-shaped recess between any two adjacent support webs, which are open at their ends opposite to the peripheral web in the longitudinal direction, and a collar shaped seal made of a thermoplastic material that is formed onto the piston body such that both the peripheral web and the support webs are pressed into the material of the collar-shaped seal at least over a portion of their height, the longitudinal support webs at the piston body running at an oblique angle in relation to a longitudinal piston axis.

2. A piston according to claim 1, wherein the longitudinal support webs extend up to the other end of the piston body.

3. A piston according to claim 1, wherein each edge of the collar-shaped seal extends beyond an end surface of the piston body associated with it.

4. A piston according to claim 1, wherein the piston body is manufactured through a process comprising powder metallurgy.

5. A piston according to claim 1, wherein the collar-shaped seal comprises polytetrafluoroethylene as a thermoplastic synthetic.

6. A piston according to claim 1, wherein the collar-shaped seal is pressed on, thereby calibrating its exterior surface at least in its area overlapping the peripheral web and the support webs.

7. A piston according to claim 1, wherein the piston is a shock absorber piston.

8. A piston for a shock absorber assembly, said piston comprising:
   a piston moveably disposed in a cylinder, said piston comprising:
      a piston body including a peripheral surface;
      at least one peripheral web formed on the peripheral surface of the piston body adjacent to a piston end, said peripheral web protruding above the peripheral surface;
      substantially longitudinal support webs formed on the piston body and coupled to the peripheral web, the support webs being disposed parallel longitudinally at a distance from one another and extending toward an other end of the piston, thereby forming a notch-shaped recess between any two adjacent support webs, the recesses being open at ends thereof opposite to the peripheral web in the longitudinal direction, the support webs being disposed at an oblique angle in relation to a longitudinal piston axis;
      and a collar-shaped seal formed of a sealing material comprising a thermoplastic, the seal being formed onto the piston body such that the peripheral web and the support webs are pressed into the sealing material at least over a portion of heights thereof.

9. A piston according to claim 8, wherein the longitudinal support webs extend up to the other end of the piston.

10. A piston according to one of claims 8, wherein each edge of the collar-shaped seal extends beyond a respective end surface of the piston body.

11. A piston according to one of claims 8, wherein the piston body is manufactured Through a process comprising powder metallurgy.

12. A piston according to one of claims 8, wherein the collar-shaped seal consists of polytetrafluoroethylene as a thermoplastic synthetic.

13. A piston according to one of claims 8, wherein the collar-shaped seal is pressed on, thereby calibrating its exterior surface at least in its area overlapping the peripheral web and the support webs.

* * * * *

UNITED STATES PATENT AND TRADEMARK OFFICE
CERTIFICATE OF CORRECTION

PATENT NO.     : 6,591,948 B2
DATED          : July 15, 2003
INVENTOR(S)    : Antonio Casellas and Ewald May It is certified that error appears in the above-identified patent and that said Letters Patent is hereby corrected as shown below:

<u>Column 3,</u>
Line 28, "recesseso" should read -- recesses to --

<u>Column 6,</u>
Line 52, "Through" should read -- through --

Signed and Sealed this

Thirtieth Day of September, 2003

JAMES E. ROGAN
*Director of the United States Patent and Trademark Office*